Feb. 16, 1932.   W. J. MEINEL   1,845,054
DRIP MOLDING ATTACHING STRUCTURE
Filed Nov.1, 1927
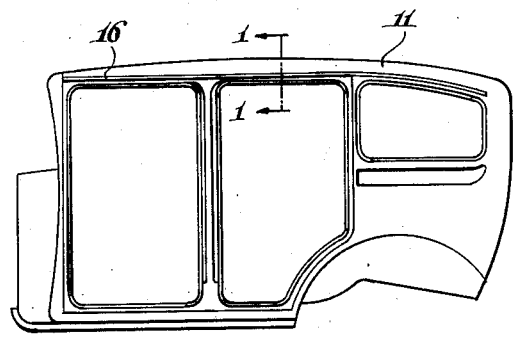
Fig. 3.
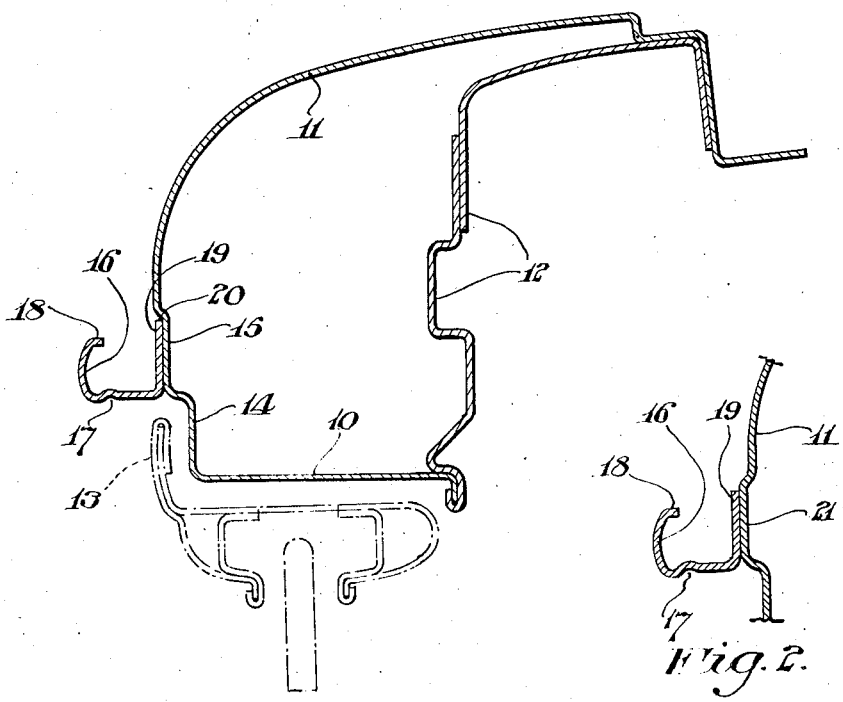
Fig. 1.
Fig. 2.
INVENTOR:
William J. Meinel,
BY John P. Sarbox
ATTORNEY.

Patented Feb. 16, 1932

1,845,054

UNITED STATES PATENT OFFICE

WILLIAM JOHN MEINEL, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

DRIP MOLDING ATTACHING STRUCTURE

Application filed November 1, 1927. Serial No. 230,260.

My invention is of a drip molding construction especially adapted for use in connection with automobile bodies which are constructed of sheet metal stampings.

The attachment of drip moldings to automobile bodies has been by various means, nearly all of which are subject to objection on scores of difficulty in alignment, difficulty in hiding the securing means and attaining a neat joint, and difficulty in obtaining a tight joint. The drip moldings are commonly applied to the roof or the top rail, or to both in the region where they come together. Screws and rivets are most commonly used. It has been necessary to clamp the drip molding in place and to drill for the rivets or screws. Insertion and fastening of these rivets and screws is a tedious and more or less difficult job on account of the angularity and closeness of the parts above the top rail. Drive screws have been used. In all of these the exposed heads have been unsightly. Attachment has been particularly difficult when the top rail and roof quarter panel are made of metal.

According to my invention I electrically weld the drip channel in place. The portable electric welding machines of today enable one to use small welding tools of proper shape by means of which the heretofore relatively inaccessible joint between the drip molding and the body is rendered readily accessible. Furthermore, I provide on the metal part to which the drip molding is to be attached, either a projection or a depression coextensive with the length of the drip molding whereby it may be readily aligned and in the latter case also effectively seated exactly in the proper position. Furthermore, the depression which is the form of my invention I prefer not only makes the joint weatherproof, but also tighter, stronger and neater. Yet further, with projection or depression detrimental effects of the heat of the welding operation are eliminated and deformation is confined to the zone of the projection or depression.

In the drawings I show two forms of my invention.

Fig. 1, the preferred form in which the roof quarter panel to which the drip molding is attached is provided with a depression.

Fig. 2, the alternative form in which the metal roof panel is provided with a projection.

Fig. 3 is the general side view of an automobile body constructed of metal showing by line 1—1 the section on which Figure 2 is taken.

In this body the top rail 10 and the arched roof panel 11 forming the side portion of the roof are formed integrally with each other. Their inner margins are connected by inner panel stampings 12 of no moment here. The top rail of the door is shown in dotted lines indicating its relation to the top rail 10 and roof panel 11. This relation is of moment here only insofar as it indicates relation of the door overlap 13 to the rabbet 14 provided in the stamping 10—11 for that purpose, and the relation of this rabbet 14 to the construction of the drip molding.

A depression 15 is formed just above the rabbet 14 along the entire length of the roof and top rail. The depression is preferably of a depth equal to the thickness of the drip channel to be attached. This channel is designated 16. It is of simple channel form. The bottom of the channel is upwardly beaded at 17 for strengthening purposes and for the same purpose the upper edge 18 of the outer side wall is inwardly flanged. The outer side wall is convexed outwardly jointly for the purpose of strengthening and improving the appearance. The inner side wall 19 is welded flatly against the depression 15 and with its upper edge 20 seated against the upper edge of depression 15. The welding is done before the inner panels 12 are put in place. In the alternative form shown in Figure 2 a projection 21 from the roof panel 11 takes the place of the depression 15.

In addition to the manifold advantages set forth at length in the preamble, it will be noted that it is feasible with this construction to use drip molding of extremely simple and inexpensive form, sheet metal bent into channel form of appropriate cross section.

The simplicity of my invention is not a bar to its modification and its modifications are intended to be covered in the annexed claims.

What I claim is:—

1. In a vehicle body, in combination, a metal roof panel having an arched side portion and a depression formed adjacent the margin of said arched side portion and a metal drip channel seated in said depression, the thickness of the metal of the channel and the depth of the depression being such that the portion of the channel seated in the depression has its outer face substantially flush with the adjacent undepressed portion of the panel, said metal channel and panel being integrally united by spot welding to form a substantially weather-proof joint and the offset between said depression and the arched side portion of the panel confining any deformation (due to the heat of the weld) to the zone of the depression.

2. In a vehicle body, in combination, a sheet metal roof panel having an arched side portion and an offset formed adjacent the margin of said arched portion and a sheet metal drip channel seated on the offset and having an attaching side wall of substantially the width of said offset, said metal channel and panel being integrally secured together by spot welding to form a substantially weather proof joint, the integrally joined drip channel and offset forming a strong longitudinal reinforcement for the margin of the roof and the offset confining any deformation (due to the heat of the weld) to the zone of the offset.

3. In a vehicle body, in combination, a sheet metal roof panel extending above a doorway opening and arched over in its upper portion to form the side of the roof and provided with a rabbet in its lower portion to receive the edge of the door overlap, and having above said rabbet a depression, a metal drip channel seated in said depression and having the portion seated in said depression substantially flush with the outer face of the panel above said depression, the channel being aligned by said depression and integrally secured thereto by spot welding to form a substantially weather proof joint and the offset formed by said depression confining any deformation (due to the heat of the weld) to the zone of the depression.

In testimony whereof I hereunto affix my signature.

WILLIAM JOHN MEINEL.